(12) United States Patent
Chia et al.

(10) Patent No.: US 11,230,987 B2
(45) Date of Patent: Jan. 25, 2022

(54) METHOD AND DEVICE FOR DIAGNOSIS OF A HIGH-PRESSURE SENSOR OF A MOTOR VEHICLE

(71) Applicant: Vitesco Technologies GmbH, Hannover (DE)

(72) Inventors: Tet Kong Brian Chia, Munich (DE); Thomas Kraft, Munich (DE); Walter Sassler, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/052,495

(22) PCT Filed: Apr. 29, 2019

(86) PCT No.: PCT/EP2019/060865
§ 371 (c)(1),
(2) Date: Nov. 2, 2020

(87) PCT Pub. No.: WO2019/211219
PCT Pub. Date: Nov. 7, 2019

(65) Prior Publication Data
US 2021/0239065 A1     Aug. 5, 2021

(30) Foreign Application Priority Data
May 3, 2018  (DE) .................... 10 2018 206 838.0

(51) Int. Cl.
*F02D 41/22* (2006.01)
*F02D 41/38* (2006.01)
*F02D 41/40* (2006.01)

(52) U.S. Cl.
CPC ....... *F02D 41/222* (2013.01); *F02D 41/3809* (2013.01); *F02D 41/40* (2013.01); *F02D 2041/223* (2013.01); *F02D 2200/0602* (2013.01)

(58) Field of Classification Search
CPC .... F02D 41/222; F02D 41/40; F02D 41/3809; F02D 2200/0602; F02D 2041/223
See application file for complete search history.

(56) References Cited

U.S. PATENT DOCUMENTS 5,727,516 A * 3/1998 Augustin ................ F02D 41/22
                                                    123/198 DB
6,234,148 B1    5/2001 Hartke .......................... 123/447
(Continued)

FOREIGN PATENT DOCUMENTS

DE     197 57 655    8/1999    ............ G01L 27/00
DE     198 34 660    2/2000    ............ F02D 41/22
(Continued)

OTHER PUBLICATIONS

Search Report for International Application No. PCT/EP2019/060865, 13 pages, dated May 7, 2019.
(Continued)

*Primary Examiner* — Joseph J Dallo
(74) *Attorney, Agent, or Firm* — Slavden Grubert Beard PLLC (57) ABSTRACT

Various embodiments include a method for diagnosis of a high-pressure sensor of a motor vehicle comprising: measuring a pressure with the high-pressure sensor; feeding the measured pressure to a control unit; evaluating the measured pressure with the control unit and determining a control signal for an amount of fuel to be injected; checking whether a first difference between two successive values of the pressure measurement signal is greater than a calculated maximum difference value; checking whether a second
(Continued)

difference between a minimum pressure measurement signal measured within a time segment and a maximum pressure measurement signal measured within the time segment is less than an expected change in the pressure measurement signal; and checking whether a measured pressure gradient is smaller than an expected pressure gradient.

8 Claims, 8 Drawing Sheets

(56) References Cited

U.S. PATENT DOCUMENTS

| | | | | |
|---|---|---|---|---|
| 8,631,688 B1* | 1/2014 | Rayl | ........................ | F01L 9/10 |
| | | | | 73/114.33 |
| 2004/0069278 A1* | 4/2004 | Okamoto | ............ | F02D 41/3082 |
| | | | | 123/458 |
| 2005/0005912 A1 | 1/2005 | Joos | .............................. | 123/458 |
| 2010/0083742 A1 | 4/2010 | Beetz | ........................ | 73/114.51 |
| 2013/0255636 A1* | 10/2013 | Pursifull | ............. | F02D 19/0613 |
| | | | | 123/446 |
| 2015/0075501 A1* | 3/2015 | Peters | ................ | F02M 25/0809 |
| | | | | 123/520 |
| 2015/0159574 A1 | 6/2015 | Stack | ..................... | F02D 41/222 |
| 2019/0136784 A1 | 5/2019 | Dölker | .................. | F02D 41/222 |
| 2020/0040835 A1* | 2/2020 | Chia | ..................... | G01M 15/08 |

FOREIGN PATENT DOCUMENTS

| | | | | |
|---|---|---|---|---|
| DE | 199 46 506 | 7/2001 | ............. | F02D 41/22 |
| DE | 103 48 610 | 5/2005 | ............. | F02D 41/22 |
| DE | 10 2006 053 950 | 5/2008 | ............. | F02M 65/00 |
| DE | 10 2016 214 760 | 11/2017 | ............. | F02D 41/22 |
| WO | 03/027472 | 4/2003 | ............. | F02D 41/38 |

OTHER PUBLICATIONS

Search Report for German Patent No. 10 2018 206 838.0, 7 pages, dated Nov. 20, 2018.

* cited by examiner

METHOD AND DEVICE FOR DIAGNOSIS OF A HIGH-PRESSURE SENSOR OF A MOTOR VEHICLE

CROSS-REFERENCE TO RELATED APPLICATIONS

This application is a U.S. National Stage Application of International Application No. PCT/EP2019/060865 filed Apr. 29, 2019, which designates the United States of America, and claims priority to DE Application No. 10 2018 206 838.0 filed May 3, 2018, the contents of which are hereby incorporated by reference in their entirety.

TECHNICAL FIELD

The present disclosure relates to sensors. Various embodiments include methods and/or devices for the diagnosis of a high-pressure sensor of a motor vehicle.

BACKGROUND

High-pressure sensors are used inter alia in the automotive industry. For example, modern motor vehicles use fuel injection systems that have a high-pressure fuel accumulator (rail), from which fuel under high pressure is injected into a combustion chamber of the respective motor vehicle by using injectors. The fuel pressure in the high-pressure fuel accumulator is controlled using a control loop based on rail pressure signals provided by a rail pressure sensor.

A rail pressure sensor generally generates a rail pressure signal in the form of a signal voltage $V_{out}$, which is fed to a control unit. The rail pressure sensor is supplied with voltage from the control unit, which provides the rail pressure sensor with a supply voltage and a ground signal. The signal voltage made available by the rail pressure sensor depends on a preprogrammed transfer function that is stored in an ASIC of the rail pressure sensor. The control unit calculates the rail pressure by evaluating the received signal voltage $V_{out}$ and a stored sensor calibration.

SUMMARY

The teachings of the present disclosure describe methods and system to diagnose the high-pressure sensor of a motor vehicle in such a way that in-range errors of the measured high-pressure signal can be detected without incurring costs for additional components. For example, some embodiments include a method for diagnosis of a high-pressure sensor of a motor vehicle, in which a pressure measurement signal is provided by means of the high-pressure sensor, the pressure measurement signal is fed to a control unit, the control unit evaluates the pressure measurement signal and determines a control signal for an amount of fuel to be injected, characterized in that the control unit is also designed for carrying out a high-pressure sensor diagnosis in which a check is made as to whether the difference between two successive values of the pressure measurement signal provided by the high-pressure sensor is greater than a calculated maximum difference value, and a check is made as to whether the difference between a minimum pressure measurement signal measured within a time segment and the maximum pressure measurement signal measured within the same time segment is less than an expected change in the pressure measurement signal provided by the high-pressure sensor, and a check is made as to whether a measured pressure gradient is smaller than an expected pressure gradient.

In some embodiments, the control unit detects the presence of an in-range error of the high-pressure sensor on the basis of these checks.

In some embodiments, the calculated maximum difference value of the pressure measurement signal provided by the high-pressure sensor is determined by an evaluation of physical events that occur in the high-pressure system.

In some embodiments, the calculated maximum difference value of the pressure measurement signal provided by the high-pressure sensor is determined by an evaluation of the injection processes carried out, activities of the high pressure pump and/or openings of the pressure relief valve.

In some embodiments, the expected change is determined on the basis of the amount of fuel to be injected in each case in a time segment and/or on the basis of an amount of fuel of the high-pressure pump delivered in a time segment.

In some embodiments, the mean value of the pressure measured in a time segment and the rail pressure controller output information are evaluated.

In some embodiments, the time segment is the duration of a combustion event.

In some embodiments, it has a control unit (12), which is designed for controlling a method as claimed in one of the preceding claims.

BRIEF DESCRIPTION OF THE DRAWINGS

Further advantageous characteristics of the teachings herein emerge from the exemplary explanation thereof below on the basis of the figures, in which.

DETAILED DESCRIPTION

In known systems is that the measured rail pressure signal is subject to a drift in practice, so that the measured rail pressure signal deviates in an undesirable manner from the actually present value of the rail pressure signal. This can have the effect for example that, in the event of a measured rail pressure signal that is too low, an overpressure occurs in the actual system, which leads to the system bursting.

In principle, the mentioned drift can be a constant positive or negative drift such that the measured rail pressure value deviates upward or downward from the actually present rail pressure value by a constant value. Alternatively, the mentioned drift can also be a positive or negative drift such that the deviation of the measured rail pressure value deviates upward or downward from the actually present rail pressure value more and more with increasing rail pressure.

Another disadvantage can occur if the measured rail pressure value stays the same or is frozen even though the actual rail pressure value continues to rise steadily. This can also cause the system to burst. In addition, a disadvantage of the known devices is that the measured rail pressure value can have atypical jumps or atypical noise.

Another disadvantage is that the transmission of the output signals from the high-pressure sensor to the control unit can be disturbed. Since the signal transmitted by the high-pressure sensor is transmitted in the form of an electrical signal voltage, any signal interference between the transmitter of the signal and the receiver of the signal can be manifested as a drift signal.

If the measured rail pressure value deviates from the actually present rail pressure value, but still lies within a permitted value range of the high-pressure system, then there is a so-called in-range error of the measured rail pressure signal. If the measured rail pressure value deviates from the actually present rail pressure value and lies outside the permitted value range of the high-pressure system, then there is a so-called out-of-range error of the measured rail pressure signal. Such out-of-range errors of the measured rail pressure value can be detected comparatively easily, since the signal voltage, which when using pull-up resistors in the control unit is for example 5 V, no longer lies in the value range of the high-voltage sensor.

In-range errors of the measured rail pressure signal, which can lead to the presence of overpressure in the high-pressure system or even to a bursting of the high-pressure system, can for example have the following causes:
- an increase in the electrical resistance in a cable harness of the high-pressure system;
- a partial short circuit in the present cable harness;
- subsequent changes in the high-pressure system;
- the supply voltage of the high-pressure sensor lying outside the permitted range.

The increase in the electrical resistance in the cable harness, in particular in the power supply cable, can lead to an undesirable drift of the measured high-pressure signal, which can lead to an overpressure in the high-pressure system or even to the high-pressure system bursting. These undesirable consequences can also be caused by an undesirable reduction in the supply voltage of the high-pressure sensor.

A short circuit to ground usually leads to the voltage being pulled down and can be detected by the control unit if the signal voltage lies in a specific low short-circuit diagnostic range. A partial short circuit, on the other hand, can lead to the voltage being pulled down, which is not detected by the control unit during its short circuit diagnosis. Such a partial short circuit means that the measured rail pressure is lower than the actually present rail pressure. This can lead to an overpressure in the high-pressure system or even to the high-pressure system bursting.

Subsequent changes in the high-pressure system are often made in order to improve the performance of the respective motor vehicle engine. The high-pressure sensor was however adjusted to normal vehicle operation before the motor vehicle was put into operation. As a result, it provides a measurement voltage that is too low. As a result, the present control system increases the amount of injected fuel flowing through the respective injector. This in turn can lead to an overpressure in the high-pressure system or even to the high-pressure system bursting.

If the supply voltage of the high-pressure sensor lies outside the permitted range, then, due to the fact that the supply voltage of the high-pressure sensor is used as a reference for the transfer function of the high-pressure sensor, this can lead to the pressure sensor output voltage drifting in an undesirable manner. For example, a supply voltage that is too low leads to a drift in the direction of a measured value that is too low. As a result, the known control systems undesirably increases the amount of injected fuel. This in turn can lead to an overpressure in the high-pressure system or even to the high-pressure system bursting.

Attempts have hitherto been made to eliminate the problems described above by using a pressure relief valve in the high-pressure system. Furthermore, attempts have hitherto been made to eliminate the problem described above by using an additional, redundant pressure sensor. The use of both of the aforementioned measures involves additional costs for the high-pressure system.

In some embodiments, there is a method for diagnosis of a high-pressure sensor of a motor vehicle, in which a pressure measurement signal is provided by means of the high-pressure sensor, the pressure measurement signal is fed to a control unit, the control unit evaluates the pressure measurement signal and determines a control signal for an amount of fuel to be injected, the control unit is also designed for carrying out a high-pressure sensor diagnosis in which
- a check is made as to whether the difference between two successive values of the pressure measurement signal provided by the high-pressure sensor is greater than a calculated maximum difference value, and
- a check is made as to whether the difference between a minimum pressure measurement signal measured within a time segment and the maximum pressure measurement signal measured within the same time segment is less than an expected change in the pressure measurement signal provided by the high-pressure sensor, and
- a check is made as to whether a measured pressure gradient is smaller than an expected pressure gradient.

In some embodiments, a diagnosis of the high-pressure sensor of a motor vehicle can be performed in software using components that are in any case present. Additional components are not required for the diagnosis of the high-pressure sensor of a motor vehicle. By means of the methods described herein, the presence of in-range errors in the output signal of the high-pressure sensor can be reliably detected, so that reliably suitable measures for avoiding undesired overpressure in the respectively present high-pressure system, and in particular also occurrence of bursting of the respective high-pressure system, can be reliably avoided.

Figure 1:
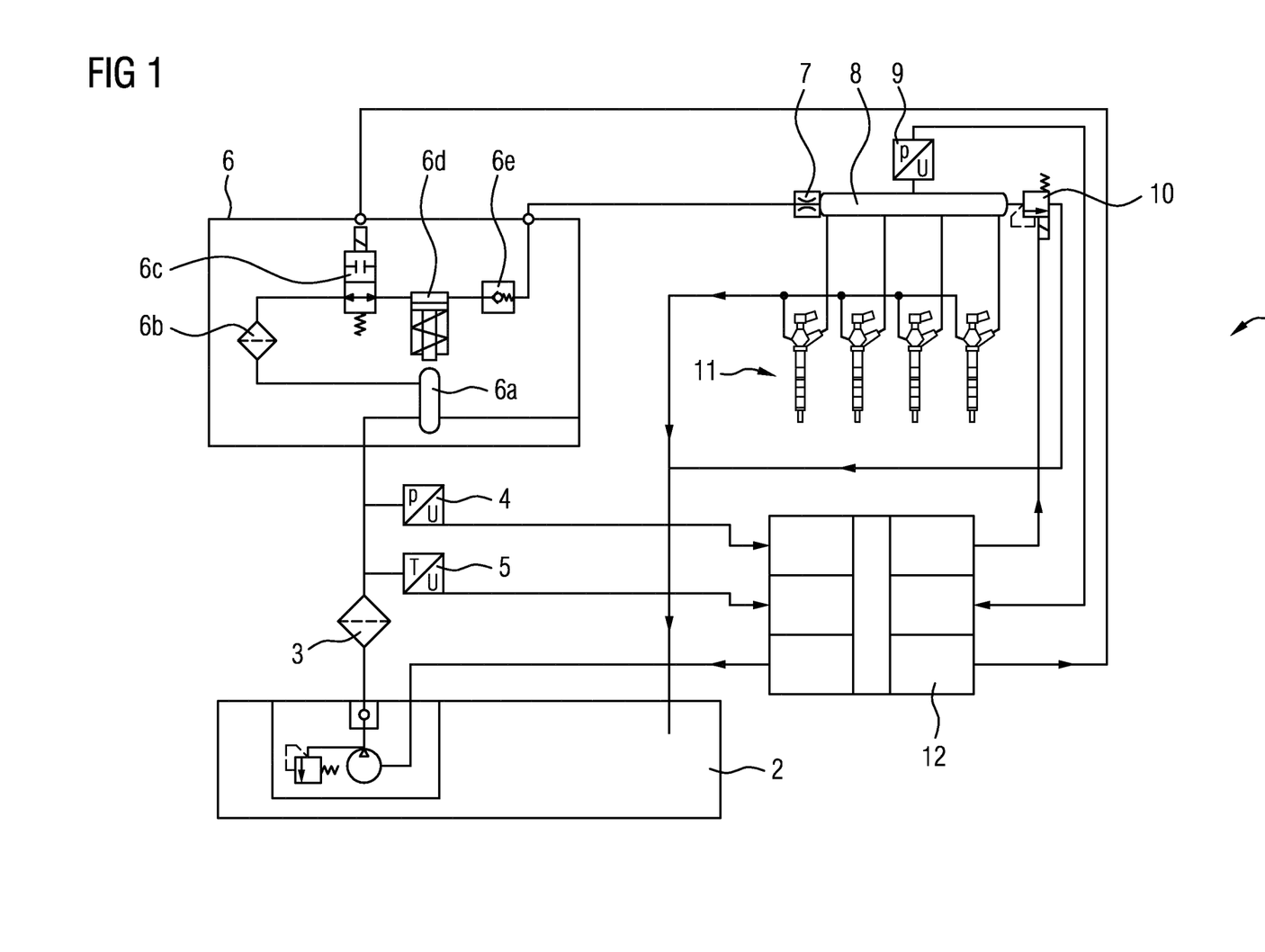
FIG. 1 shows a block diagram of a diesel common rail injection system of a motor vehicle.

FIG. 1 shows a block diagram of a fuel injection system of a motor vehicle. The system shown is a diesel common rail injection system 1. This has a fuel tank 2, from which fuel is fed to a high-pressure pump device 6 by means of a fuel pump via a fuel filter 3. Arranged in the area between the fuel filter 3 and the high-pressure pump device 6 are a low-pressure sensor 4, intended for measuring the fuel pressure, and a temperature sensor 5, intended for measuring the fuel temperature, the output signals of which are fed to a control unit 12.

The high-pressure pump device 6 has an eccentric chamber 6a, an inlet filter 6b, an inlet valve 6c, a high-pressure cylinder 6d with a high-pressure piston and an outlet valve 6e.

The fuel provided by the fuel filter 3 flows through the eccentric chamber 6a and the inlet filter 6b and from there via the inlet valve 6c into the high-pressure cylinder 6d. There, the fuel pressure is increased to a desired high pressure by means of the high-pressure piston. The compressed fuel then leaves the high-pressure pump device 6 via the outlet valve 6e in order to reach a high-pressure accumulator or rail 8 via the rail inlet aperture 7. From the rail 8, the fuel under high pressure is injected into a combustion chamber of the respective motor vehicle by using fuel injectors 11. The control of the fuel pump arranged in the fuel tank, the control of the inlet valve 6c of the high-pressure pump device 6 and the control of the processes for injecting into the respective combustion chamber are performed by the control unit 12, which provides the necessary control signals. To determine these control signals, the control unit 12 uses stored work programs, stored data fields, and sensor signals fed to it, which include the sensor signal provided by the low-pressure sensor 4, the sensor signal provided by the temperature sensor 5 and a sensor signal provided by a high-pressure sensor 9. The pressure of the fuel in the rail 8 is measured by the high-pressure sensor 9.

Furthermore, the diesel common rail injection system 1 shown in FIG. 1 has a pressure reducing valve 10 connected to the rail 8, the task of which is to reduce the fuel pressure present in the rail 8 to a predefined pressure value when the desired pressure reduction can no longer be achieved by the amount by which it decreases in the injectors. In this case, fuel is returned from the rail 8 into the fuel tank 2.

Figure 2:
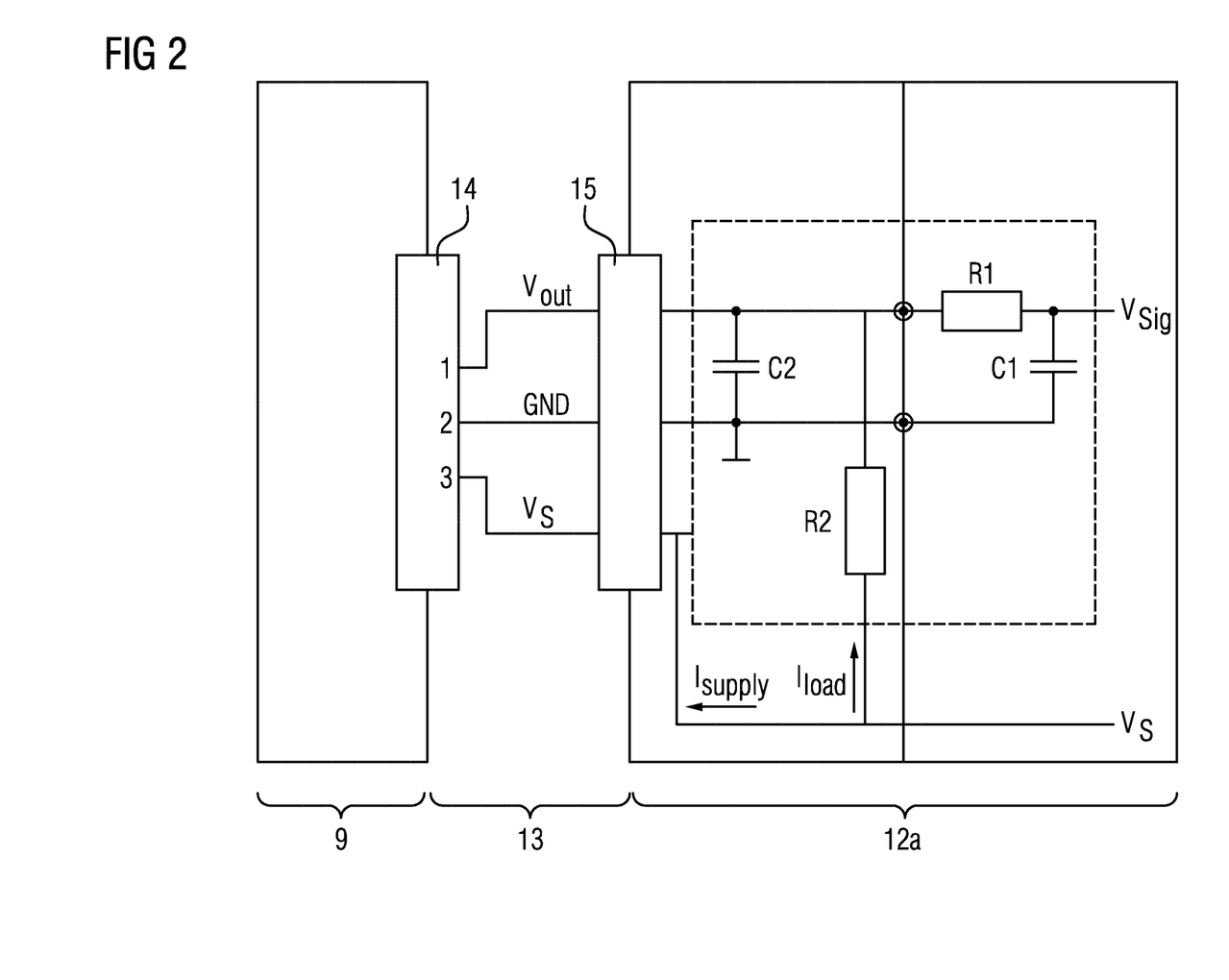
FIG. 2 shows a block diagram of a high-pressure sensor connected to the input circuit of a control unit by means of a cable harness.

FIG. 2 shows a block diagram from which it can be seen how the high-pressure sensor 9 shown in FIG. 1 is connected to an input circuit 12a of the control unit 12 shown in FIG. 1 by means of a cable harness 13. It can be seen that the high-pressure sensor 9 provides a signal voltage $V_{out}$ as an output signal, which is transmitted via a connection point 14 of the high-pressure sensor 9 to a connection point 15 of the input circuit 12a of the control unit 12. Furthermore, it can be seen that the high-pressure sensor 9 is supplied with energy via the input circuit 12a of the control unit 12, the high-pressure sensor 9 being provided with a supply voltage $V_s$ and a ground signal GND at its connection point 14. The signal voltage $V_{out}$, the supply voltage $V_s$ and the ground signal GND are transmitted between the connection points 14 and 15 via a cable harness 13. At an output of the input circuit 12a, a signal voltage $V_{Sig}$ is provided, and is forwarded to an analog-digital converter (not shown) of the control unit 12.

As can also be seen from FIG. 2, the input circuit 12a of the control unit 12 has an input for the supply voltage $V_s$, current paths $I_{load}$ and $I_{supply}$, resistors R1 and R2 and capacitors C1 and C2. The output signal of the high-pressure sensor 9, which is the signal voltage $V_{out}$, is evaluated on the basis of a transfer function that is stored in a memory of the control unit 12.

Figure 3:
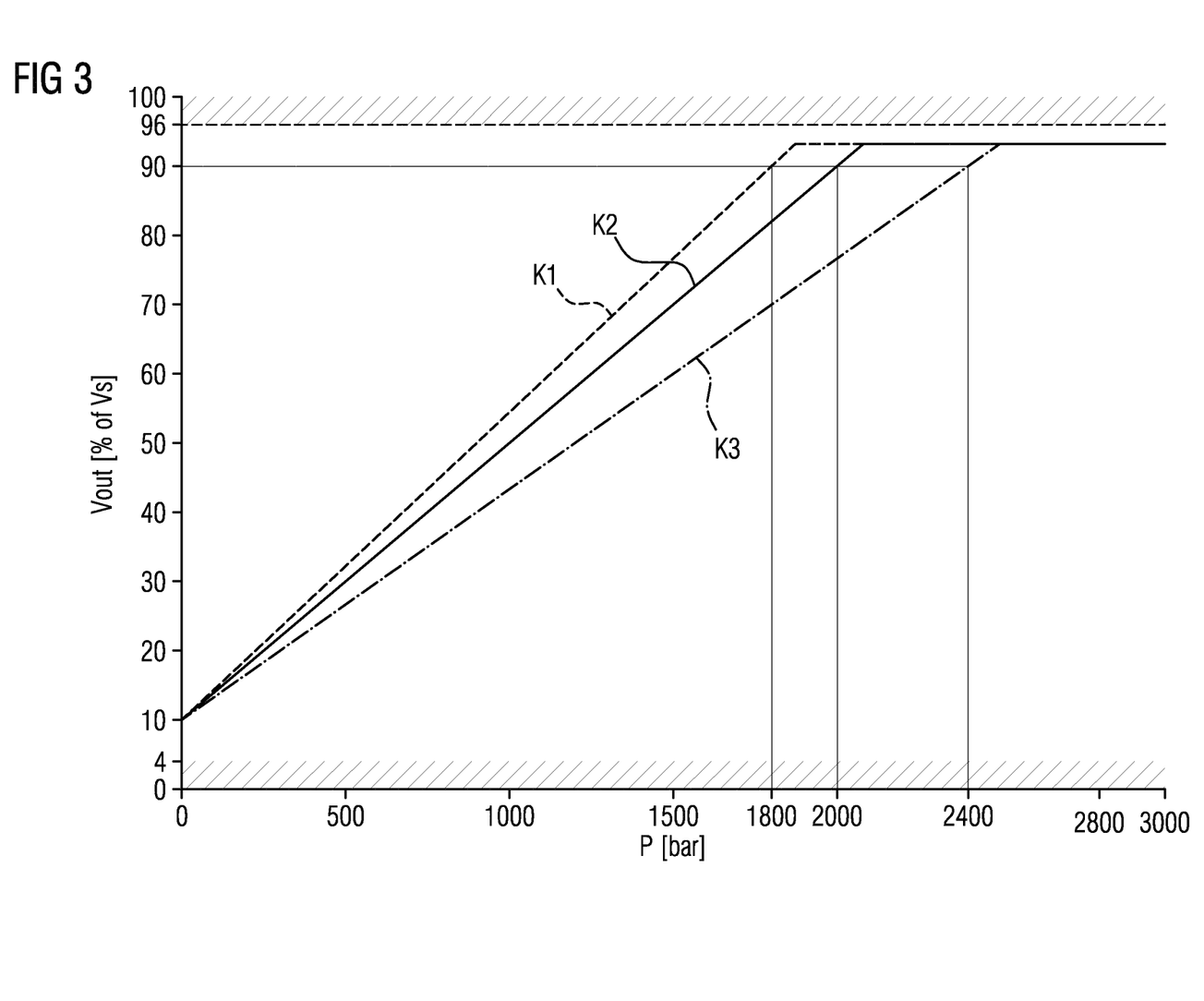
FIG. 3 shows a diagram to illustrate transfer functions of a high-pressure sensor.

FIG. 3 shows a diagram to illustrate the transfer functions of a high-pressure sensor, which are based on different calibrations. The signal voltage Vout is plotted upward as a percentage of the supply voltage Vs and the pressure in bars to the right. The curve K1 shown in FIG. 3 illustrates a transfer function which corresponds to a calibration of a measured value range up to 1800 bar. The curve K2 shown in FIG. 3 illustrates a transfer function which corresponds to a calibration of a measured value range up to 2000 bar. The curve K3 shown in FIG. 3 illustrates a transfer function which corresponds to a calibration of a measured value range up to 2400 bar. The control unit 12 calculates the fuel pressure by an evaluation of the received signal voltage $V_{out}$ and the stored calibration.

The fuel pressure calculated by the control unit can be subject to drift. This means that the calculated fuel pressure can deviate from the actually present fuel pressure. In the case of the high-pressure system described above, this can have the effect that, if the calculated fuel pressure is lower than the actually present fuel pressure, overpressure is created, which in the worst case can lead to the high-pressure system bursting.

Figure 4:
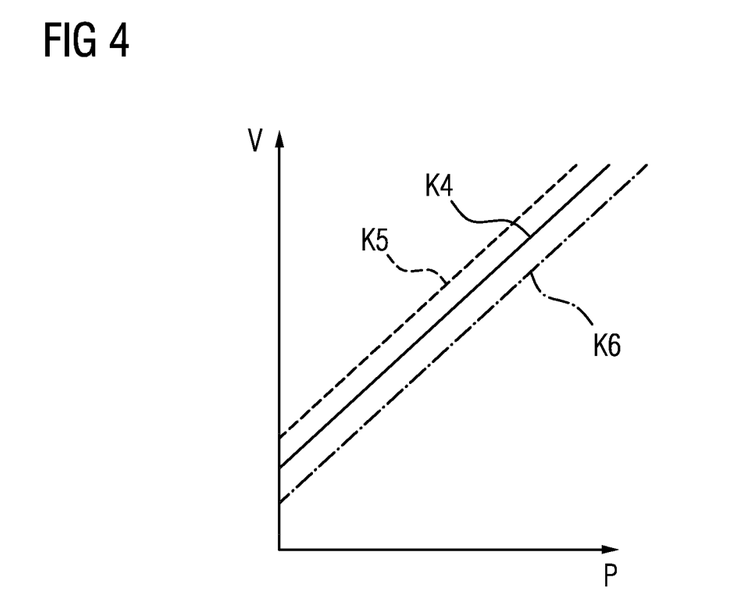
FIG. 4 shows a diagram to illustrate constant drifts in the measured signal voltage.

FIG. 4 shows a diagram to illustrate constant drifts in the measured signal voltage. The signal voltage V is plotted upward and the pressure P toward the right. The curve K4 shows the nominal signal voltage output by the high-pressure sensor 9, which is stored as a calibration in the microcontroller of the control unit. The curve K5 shows the voltage detected by the control unit in the presence of positive drift, in the case of which the calculated fuel pressure is greater than the actual fuel pressure. In this case there is the risk that the requested pressure is too low. The curve K6 shows the voltage detected by the control unit in the presence of negative drift, in the case of which the calculated fuel pressure is lower than the actually present fuel pressure. In this case there is the risk of overpressure occurring.

Figure 5:
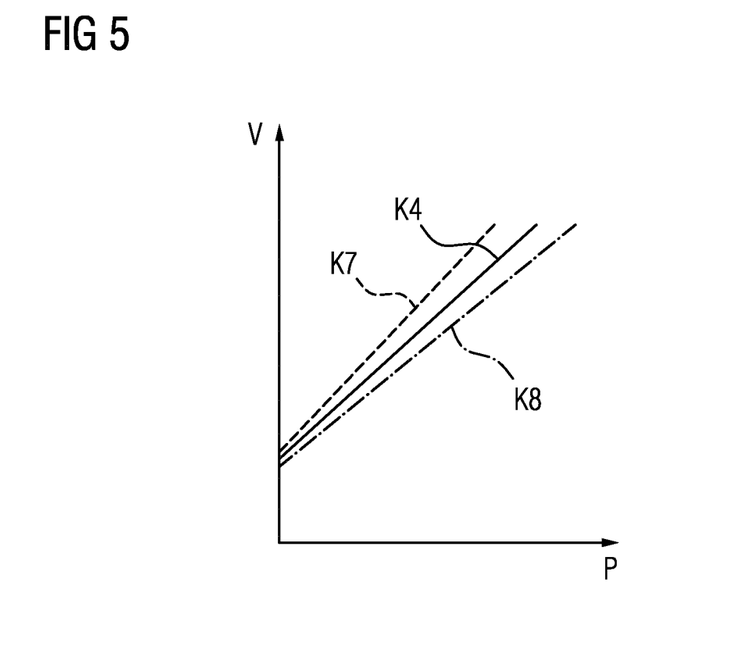
FIG. 5 shows a diagram to illustrate drifts of the measured signal voltage that increase over the pressure range.

FIG. 5 shows a diagram to illustrate drifts in the measured signal voltage that increase over the pressure range. The signal voltage V is plotted upward and the pressure P toward the right. The curve K4 shows the nominal signal voltage output by the high-pressure sensor 9, which is stored as a calibration in the microcontroller of the control unit. The curve K7 shows the voltage detected by the control unit in the presence of positive drift, in the case of which, with increasing fuel pressure, the calculated fuel pressure becomes increasingly greater than the actual fuel pressure. In this case there is the risk that the requested pressure is too low. The curve K8 shows the voltage detected by the control unit in the presence of negative drift, in the case of which, with increasing fuel pressure, the calculated fuel pressure becomes increasingly lower than the actual fuel pressure. In this case there is the risk of overpressure occurring.

Figure 6:
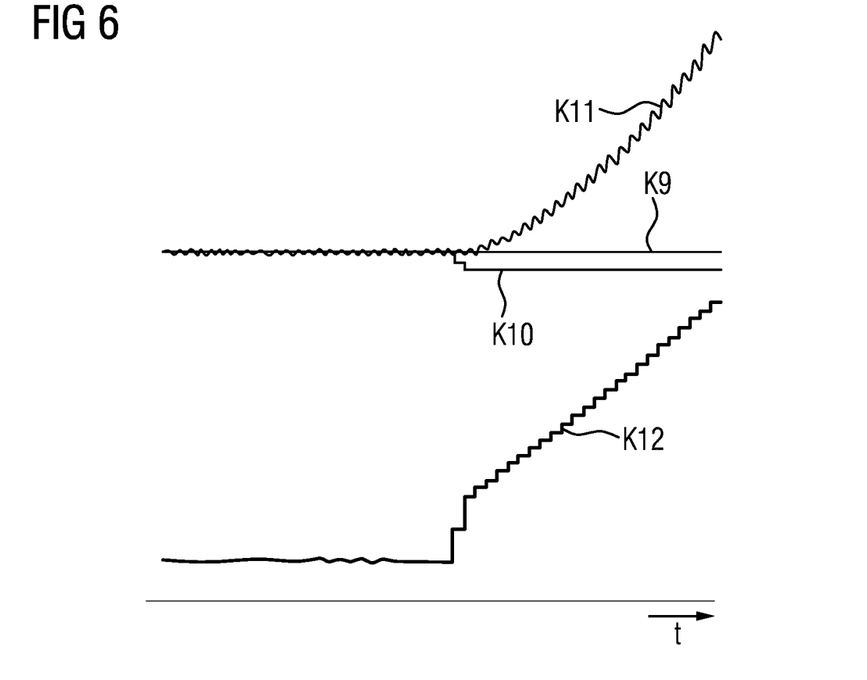
FIG. 6 shows a diagram to illustrate the freezing of the measured signal voltage.

FIG. 6 shows a diagram to illustrate an undesired freezing of the measured signal voltage. The time t is plotted to the right. The curve K9 describes the course of the setpoint value for the signal voltage. The curve K10 shows the measured signal voltage, which from a certain point in time is frozen at a lower voltage value lying below the setpoint value. The curve K12 illustrates a control signal for the high-pressure pump unit provided by the control unit after the detection of a measured signal voltage that is too low, on the basis of which the fuel pressure is to be increased in such a way that it again matches the setpoint value. The curve K11 shows the course of the fuel pressure actually occurring in the rail 8, which arises on the basis of the aforementioned control signal. Since this increased pressure is not detected by the control unit due to the frozen measurement signal, the increase in the actual fuel pressure in the rail 8 can lead to the entire high-pressure system bursting.

Figure 7:
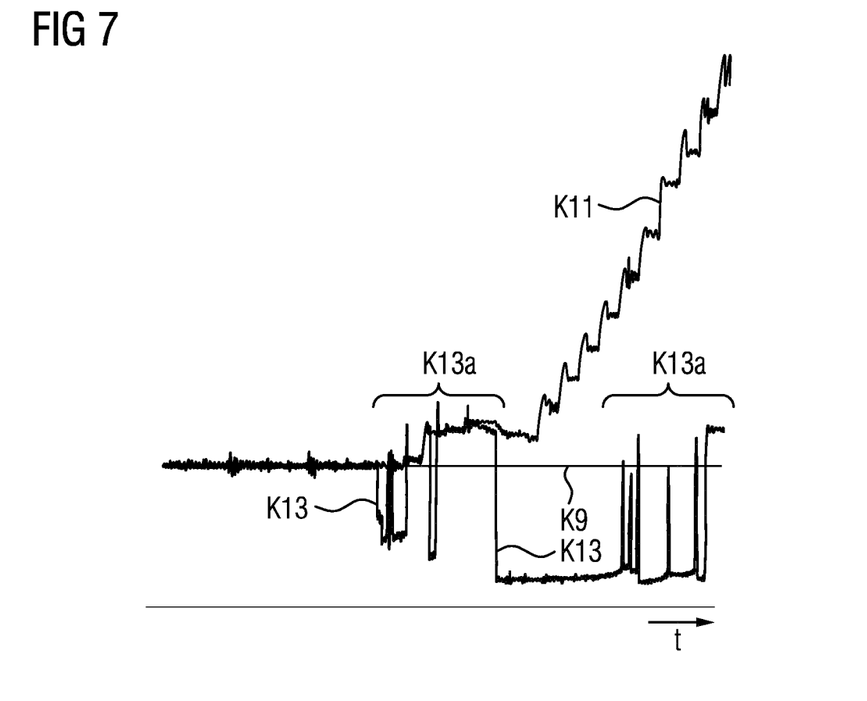
FIG. 7 shows a diagram to illustrate undesired jumps and undesired noise in the measured signal voltage.

FIG. 7 shows a diagram to illustrate undesired jumps and undesired noise in the measured signal voltage. The time t is again plotted to the right. The curve K9 describes the course of the setpoint value for the signal voltage. The curve K13 describes the measured signal voltage, which has an abnormal signal profile in the areas K13a, which indicates the presence of undesired signal jumps and/or undesired noise. The curve K11 shows the course of the fuel pressure actually occurring in the rail 8, which arises due to the course of the curve K13 shown. This increase in the fuel pressure actually occurring in the rail 8 can also lead to the high-pressure system bursting.

Figure 8:
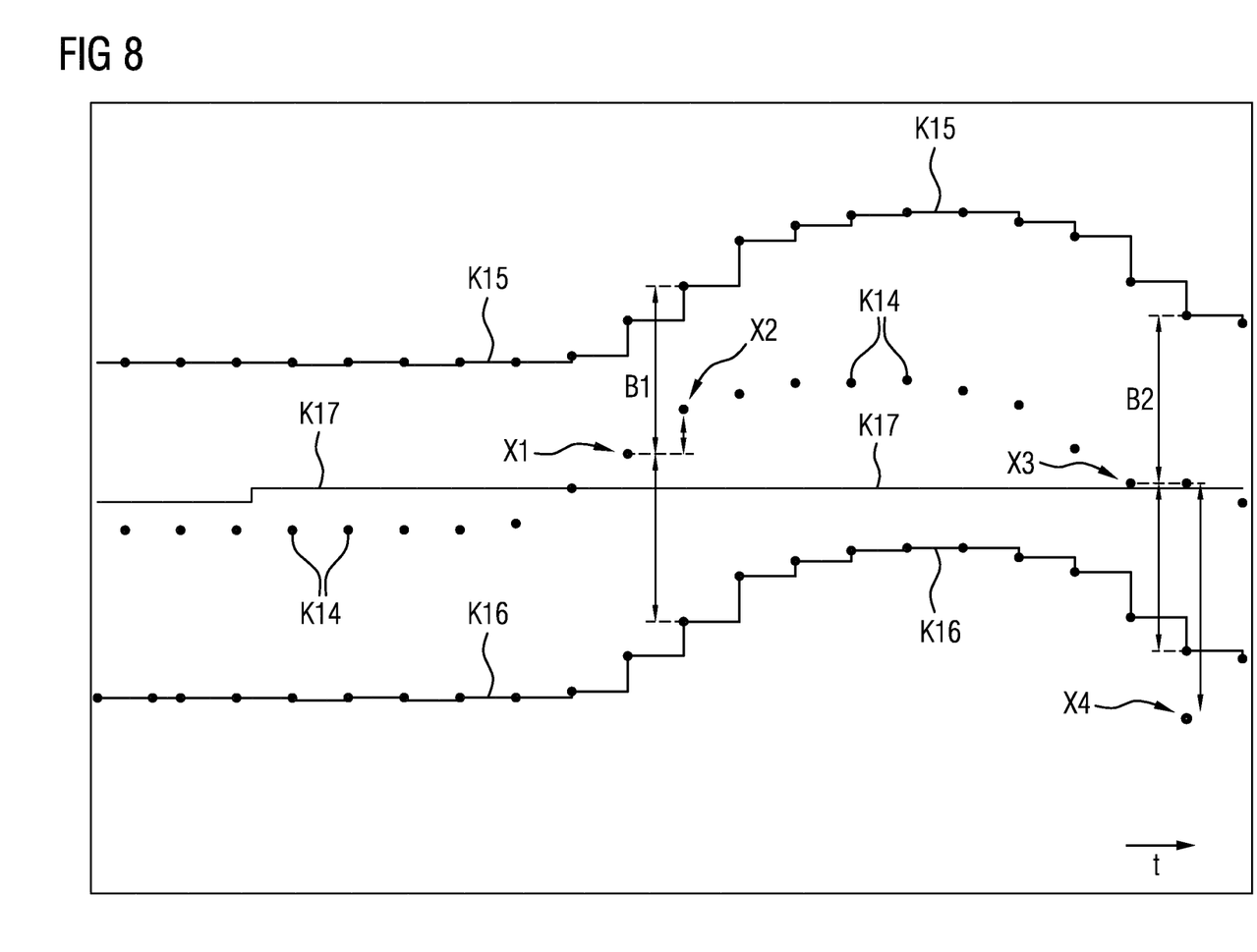
FIG. 8 shows a diagram to explain a first detection strategy.

FIG. 8 shows a diagram to explain a first detection strategy which is used in the methods described herein. The aim of this first detection strategy is to detect implausible signal jumps, implausible noise and implausible peaks in the measured pressure signal. In the case of this first detection strategy, the high-resolution voltage signal that is provided by the high-pressure sensor 9 is used. It is checked whether the difference between two successive values of this high-resolution voltage signal is larger or smaller than a calculated maximum permissible difference value or not. This maximum permissible difference value is calculated by an evaluation of physical events that occur in the high-pressure system. This includes performed injection processes, activities of the high-pressure pump, openings of the pressure relief valve, etc. Injection processes and also openings of the pressure reduction valve are thus always associated with a reduction in the fuel pressure in the rail, while activities of the high pressure pump are always associated with an increase in the fuel pressure in the rail.

Implausible signal jumps, implausible noise, and implausible peaks in the measured pressure signal are detected when the difference between successive values of the high-resolution voltage signal is greater than the calculated maximum permissible difference value.

This is explained in greater detail below with reference to FIG. 8. This shows a diagram to explain the first detection strategy described above. In this diagram, the time t is plotted to the right. The curve K17 describes a mean pressure value which corresponds to the low-resolution pressure measurement signal. The curve K16 describes a calculated lower limit value for a permissible interval in which a respective subsequent value of the high-resolution voltage signal may lie in order to be detected as free from implausible signal jumps, implausible noise and implausible peaks of the measured pressure signal. The curve K15 describes a calculated upper limit value for a permissible interval in which a respective subsequent value of the high-resolution voltage signal may lie in order to be detected as free of implausible signal jumps, implausible noise and implausible peaks of the measured pressure signal. The individual values denoted by K14 are the successive values of the high-resolution voltage signal.

One of these values of the high-resolution voltage signal is denoted in FIG. 8 by X1, the subsequent value by X2. With respect to the value X2, a check is made as to whether this value lies within the permissible interval calculated for X2, which lies between a lower limit value associated with the value X2 and an upper limit value associated with the value X2. The interval given by these two limit values is indicated in FIG. 8 by a vertical line denoted as B1. It can be seen that the value X2 lies within this interval B1, so that the high-resolution voltage signal at this point is detected as free from implausible signal jumps, implausible noise and implausible peaks of the measured pressure signal.

Another of these values of the high-resolution voltage signal is denoted in FIG. 8 by X3, and the subsequent value by X4. With respect to the value X4, a check is made as to whether this value lies within the permissible interval calculated for X4, which lies between a lower limit value associated with the value X4 and an upper limit value associated with the value X4. The interval given by these two limit values is indicated in FIG. 8 by a vertical line denoted as B2. It can be seen that the value X4 lies outside this interval B2, so that the high-resolution voltage signal at this point is detected as not being free of implausible signal jumps, implausible noise and implausible peaks of the measured pressure signal.

Figure 9:
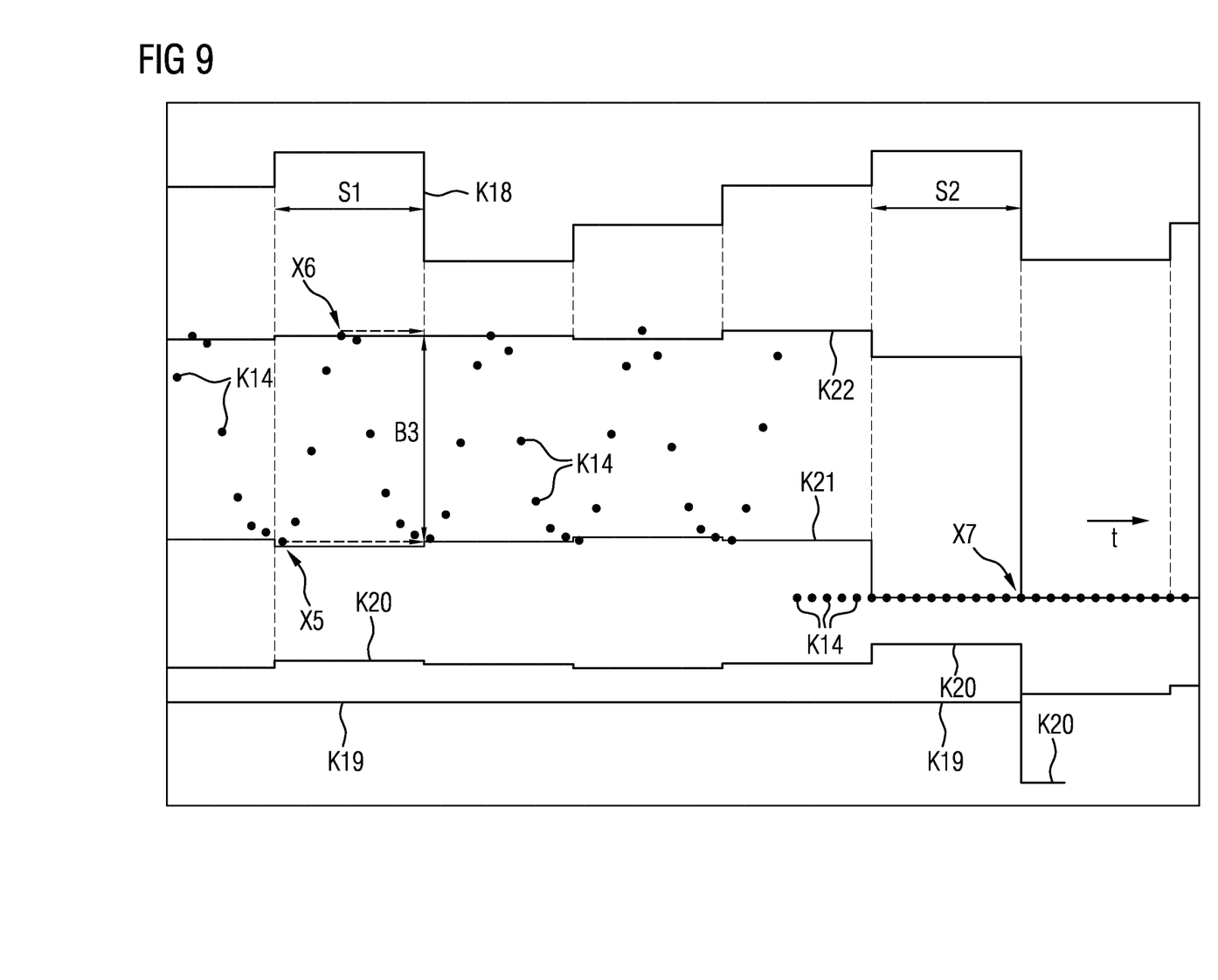
FIG. 9 shows a diagram to explain a second detection strategy and FIG. 10 shows a diagram to explain a third detection strategy.

FIG. 9 shows a diagram to explain a second detection strategy which is used in the methods described herein. The aim of this second detection strategy is to detect an implausible freezing of the high-resolution voltage signal. In the case of this second detection strategy, the high-resolution voltage signal that is provided by the high-pressure sensor 9 is also used. It is checked whether the difference between a minimum value of the high-resolution voltage signal present within a time segment and the maximum value of the high-resolution voltage signal present within the same time segment is smaller than an expected minimum pressure change based on physical events, for example a fuel injection process or an activity of the high-pressure pump. The time segment mentioned is for example the duration of a combustion event, for example 180° CRK for a motor vehicle with 4 cylinders and 4 strokes. The expected minimum pressure change within a time segment is determined on the basis of the amount of fuel to be injected in each case and/or on the basis of the fuel delivery rate of the high-pressure pump.

This second detection strategy is explained in greater detail with reference to FIG. 9. In FIG. 9, the individual values denoted by K14 are again successive values of the high-resolution voltage signal. The duration of successive time segments can be seen from the course denoted by K18, one of these time segments being denoted by S1 and a second of these time segments being denoted by S2. The curve K19 describes the course of the expected change in pressure for a respective time segment, taking into account a safety margin. The curve K19 describes the course of the differences between the minimum value present in a time segment and the maximum value present in the same time segment. The curve K21 describes the course of the minimum values determined within successive time segments, the respective minimum value being determined at the end of each time segment. The curve K22 describes the course of the determined maximum values within successive time segments, the respective maximum value being determined at the end of each time segment.

One of these values of the high-resolution voltage signal is denoted in FIG. 9 by X5, and another value by X6. X5 is the minimum value of the high-resolution voltage signal in time segment S1. X6 is the maximum value of the high-resolution voltage signal in time segment S1. At the end of time segment S1, the difference between X6 and X5 is calculated. This difference is denoted in FIG. 9 by B3. A comparison of the curves K19 and K20 at the end of the segment S1 shows that the difference between the maximum value X6 and the minimum value X5 calculated at the end of this segment S1 is greater than the minimum difference expected for the segment S1. At this point it is consequently detected that the high-resolution voltage signal is free from an implausible freezing of the high-resolution voltage signal.

Another of the values of the high-resolution voltage signal is denoted in FIG. 9 by X7. X7 is a value that is both the minimum value of the high-resolution voltage signal in time segment S2 and the maximum value of the high-resolution voltage signal in this time segment S2.

A comparison of the curves K19 and K20 at this point, i.e. at the end of time segment S2, shows that at this point in time the difference between the minimum value of the high-resolution voltage signal present within this time segment and the maximum value of the high-resolution voltage signal present within the same time segment is smaller than the expected minimum pressure change based on physical events. As a result, it is detected at this point that there is an implausible freezing of the high-resolution voltage signal, so that suitable countermeasures must be taken.

Figure 10:
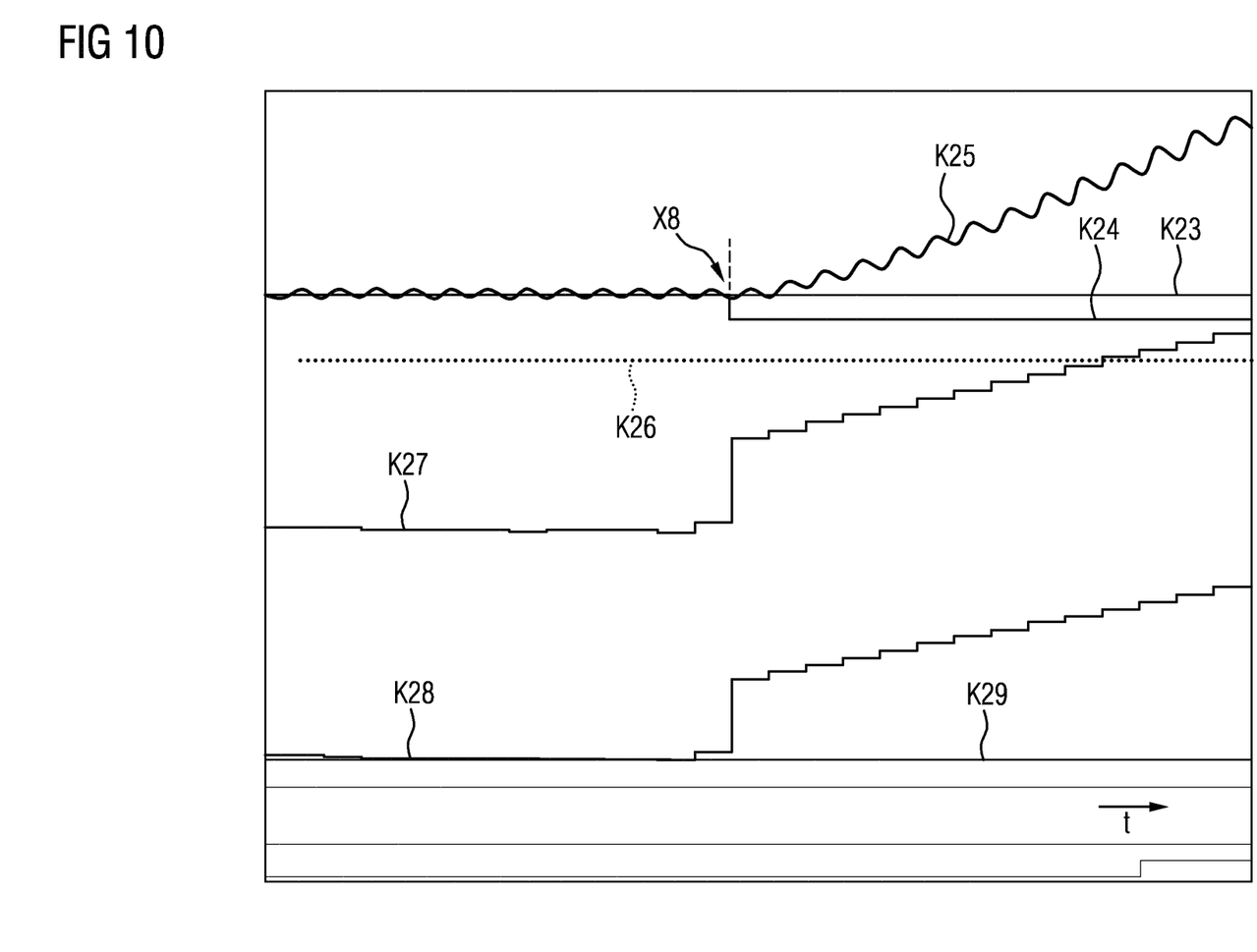

FIG. 10 shows a diagram to explain a third detection strategy which is used in the methods described herein. The aim of this third detection strategy is to detect the presence of implausible pressure gradients. In the case of this third detection strategy, the mean value of the pressure measured in a time segment and the rail pressure controller output information are evaluated. The principle of this diagnosis is based on a mass balance. Any additional increase in the amount of fuel directed into the rail that exceeds the associated system consumption must be accompanied by an associated increase in pressure. This additional increase in the amount of fuel is reflected in the rail pressure controller and can therefore be monitored. An expected pressure gradient can be calculated on the basis of the control value. The measured pressure gradient can be calculated from the rail pressure measured from time segment to time segment.

If it is found that the control value is greater than a calibrated threshold value, the pressure gradient is checked by comparing the measured pressure gradient with the expected pressure gradient on the basis of the control value. If the measured pressure gradient is smaller than the expected pressure gradient, then it is detected that, on the basis of the mass balance, an implausible pressure gradient is present.

Thus, the curve K23 in FIG. 10 describes the course of the setpoint value of the rail pressure over time. X8 denotes a point in time from which the mean value of the measured rail pressure falls below the rail pressure setpoint value. This mean value of the measured rail pressure is described by curve K24. The curve K25 describes the course of the actual rail pressure. This curve K25 rises after the point in time X8. The curve K26 illustrates the calibrated controller threshold value. The curve K27 shows the course of the rail pressure controller output signal, which has proportional and integral components, but can also have a differential component. From the point in time X8, the rail pressure controller tries to compensate for the deviation of the measured pressure from the setpoint pressure that is present from this point in time X8 by increasing the amount of fuel delivered by the high-pressure pump. At a later point in time, which can be seen from FIG. 10, the rail pressure controller output signal intersects or passes over the calibrated controller threshold value. At this point in time, the checking of the pressure gradients based on a mass balance is enabled.

The curve K28 denotes the pressure gradient expected from time segment to time segment, which is based on the control value. The curve K29 describes the pressure gradient measured from time segment to time segment. At the point in time at which the rail pressure controller output signal K27 intersects or passes over the calibrated controller threshold value K26, the measured pressure gradient, which is described by curve K29, has been detected as being smaller than the expected pressure gradient, which is described by the curve K28. This confirms the presence of an implausible pressure gradient on the basis of the mass balance.

What is claimed is:

1. A method for diagnosis of a high-pressure sensor of a motor vehicle, the method comprising:
    measuring a pressure with the high-pressure sensor;
    feeding the measured pressure to a control unit;
    evaluating the measured pressure with the control unit and determining a control signal for an amount of fuel to be injected;
    checking whether a first difference between two successive values of the pressure measurement signal is greater than a calculated maximum difference value; and
    checking whether a second difference between a minimum pressure measurement signal measured within a time segment and a maximum pressure measurement signal measured within the time segment is less than an expected change in the pressure measurement signal; and
    checking whether a measured pressure gradient is smaller than an expected pressure gradient.

2. The method as claimed in claim 1, further comprising identifying an in-range error of the high-pressure sensor on the basis of the checks.

3. The method as claimed in claim 1, wherein the maximum difference value of the pressure measurement signal is determined by evaluating physical events occurring in the high-pressure system.

4. The method as claimed in claim 1, wherein the calculated maximum difference value of the pressure measurement signal is determined by evaluating at least one of: the injection processes, activities of the high pressure pump, and openings of the pressure relief valve.

5. The method as claimed in claim 1, wherein the expected change is determined on the basis of an amount of fuel to be injected in a time segment and/or on an amount of fuel delivered in a time segment.

6. The method as claimed in claim 1, further comprising evaluating a mean value of pressure measured in a time segment and the rail pressure controller output information.

7. The method as claimed in claim 1, wherein the time segment comprises the duration of a combustion event.

8. A device for diagnosis of a high-pressure sensor of a motor vehicle, the device comprising a control unit programmed to:
    evaluate a pressure measured by the sensor;
    determine a control signal for an amount of fuel to be injected;
    check whether a first difference between two successive values of the pressure measurement signal is greater than a calculated maximum difference value; and
    check whether a second difference between a minimum pressure measurement signal measured within a time segment and a maximum pressure measurement signal measured within the time segment is less than an expected change in the pressure measurement signal; and
    check whether a measured pressure gradient is smaller than an expected pressure gradient.

* * * * *